June 22, 1965   J. E. GRIZZLE, JR   3,190,592
SHOCK ABSORBER FOR VEHICLE SEATS
Filed Nov. 6, 1962
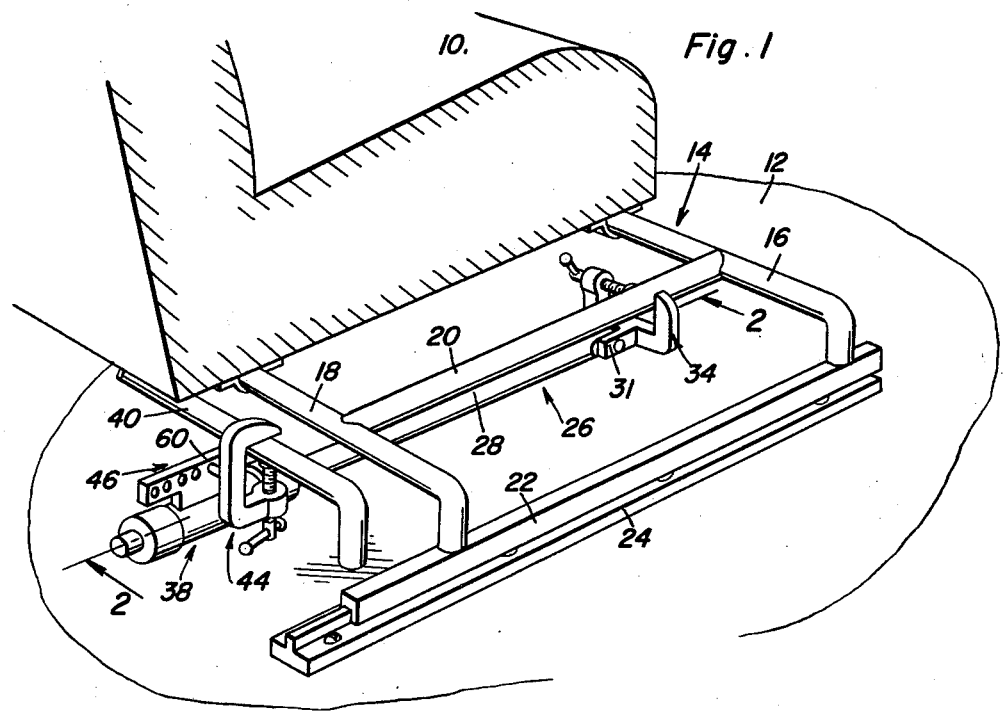
Fig. 1
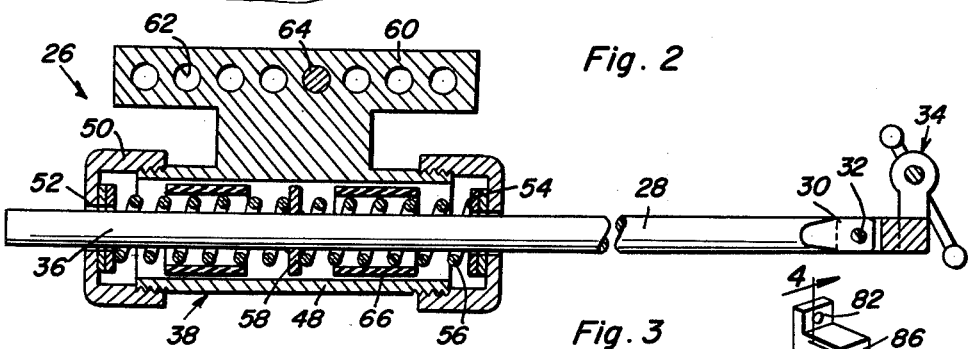
Fig. 2
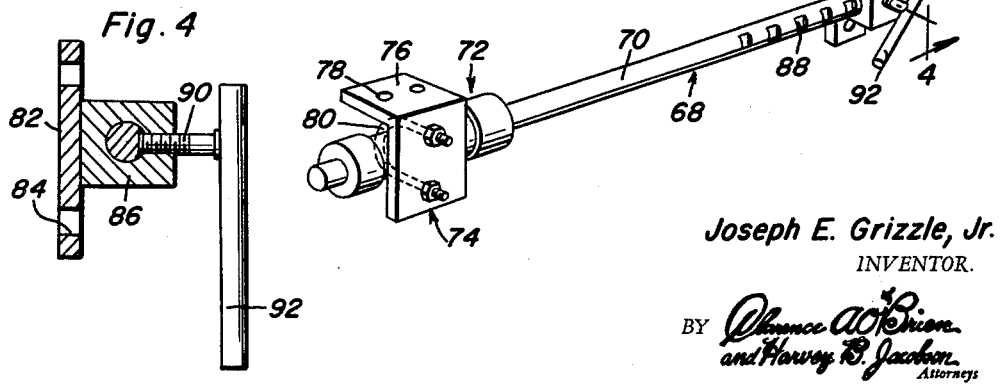
Fig. 3
Fig. 4
Joseph E. Grizzle, Jr.
INVENTOR.

United States Patent Office 3,190,592
Patented June 22, 1965

3,190,592
SHOCK ABSORBER FOR VEHICLE SEATS
Joseph E. Grizzle, Jr., Jerseyville, Ill.
(2704 St. Ambrose Lane, Godfrey, Ill.)
Filed Nov. 6, 1962, Ser. No. 235,714
7 Claims. (Cl. 248—20)

This invention relates to the adjustable mounting of a vehicle seat and is particularly useful for the mounting of the driver's seat in a truck tractor subjected to vibrations in a horizontal plane. The invention is therefore particularly suited for overcoming the problem of "back slap" usually associated with truck tractors when traveling over most highways and hence constitutes a device for alleviating a health problem in connection with drivers subjected to the aforementioned horizontal vibrations for prolonged periods.

It is therefore a primary object of the present invention to provide a shock absorber device capable of being applied to slidably mounted vehicle seats of all types accommodating adjustable positioning of such seats yet operative to absorb minor and continuous horizontal vibrations as well as the more infrequent violent vibrations. The shock absorber device while particularly useful in connection with truck tractors, is also useful in connection with vehicles of other types such as agricultural tractors and other vehicles wherein forward and backward movement or "back slap" is a problem.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one typical installation of one form of shock absorber device of the present invention.

FIGURE 2 is a section view taken substantially through a plane indicated by section line 2—2 in FIGURE 1.

FIGURE 3 is a perspective view of another form of shock absorber device constructed in accordance with the principles of the present invention.

FIGURE 4 is a sectional view taken substantially through a plane indicated by section line 4—4 in FIGURE 3.

Referring now to the drawings in detail, it will be observed that a vehicle seat 10 such as that provided for the driver of a tractor truck vehicle, is mounted in spaced relation above a substantially horizontal floor member 12 of the vehicle. The seat 10 is therefore rigidly mounted on a base frame assembly 14 including for example frame members 16 and 18 interconnected by cross brace members 20 and secured to slide members 22 slidably received upon fixed adjustment track members 24 secured to the vehicle floor 12 in any suitable manner so as to slidably mount the seat for adjustable movement in a forward or rearward direction. The vehicle seat is therefore held in adjusted position with respect to the floor 12 by means of the shock absorber device generally referred to by reference numeral 26.

Referring therefore to FIGURES 1 and 2, it will be observed that the shock absorber device includes an elongated rigid rod member 28 having a forward end portion 30 pivotally connected to a clevis element 31 by means of the pivot pin 32. The clevis element 31 is secured to the side of a C-clamp device 34 adapted to be clamped to vertical surfaces on the connecting brace member 20 of the base assembly 14. The rear end portion 36 of the elongated rod, is received within a cylindrical housing assembly 38 adapted to be secured to the floor 12 of the vehicle. Accordingly, a frame member 40 may be secured to the floor 12 in any suitable manner for presenting horizontal surfaces to which the C-clamp device 44 may be secured, the C-clamp device 44 being adjustably connected to the housing assembly 38 by means of an adjustment device 46 for the purpose of adjusting the position of the seat relative to the floor.

As more clearly seen in FIGURE 2, the housing assembly includes a cylindrical member 48 the opposite axial ends of which are externally threaded for receiving end cap members 50 through which the rear portion of the elongated rod extends. Accordingly, each end cap is provided with an aperture 52 and thrust washers 54 against which one end of a pair of centering spring elements 56 react. The confronting ends of the centering spring elements 56 therefore bear against a thrust washer 58 welded to the rear portion 36 of the elongated rod. Accordingly, the elongated rod will be held in an adjusted position relative to the floor by the centering spring elements 56 and the adjustable connection of the cylinder assembly to the vehicle floor by means of the adjustment device 46. The adjustment device therefore includes an upward extension 60 fixed to the housing member provided with a plurality of spaced apertures 62. A rigid rod element or pin 64 is secured to the C-clamp device 44 and is received within one of the apertures 62 in accordance with the adjusted position. It will therefore be appreciated, that once the C-clamp devices 34 and 44 are secured respectively to the floor through the frame member 40 and to the base assembly of the seat through the base frame member 20, the seat may be readjusted by changing the aperture 62 through which the rod 64 is received. It will also be observed, that the C-clamp devices engage surfaces on the seat base assembly and floor respectively which are disposed perpendicular to each other so as to better resist the relative thrust applied becaue of vibratory forces imposed on the vehicle and seat.

The centering spring elements 56 which are relatively stiff springs, will therefore be operative for any given adjusted position of the housing assembly, to yieldably resist horizontal displacing forces and thereby effectively eliminate the minor yet continuous "back slap" to which the vehicle driver may be subjected. The infrequent yet violent displacing forces, may also be accommodated for which reason a pair of buffer elements in the form of tubular hose sections 66 are disposed about the centering spring elements between the end cap members 50 and the thrust washer 58. The hose sections 66 may be made of resilient materials such as neoprene so as to cushion excessive displacement of the thrust washer 58 with respect to the housing assembly 38 in either direction.

Referring now to FIGURES 3 and 4, another form of shock absorber device 68 is illustrated. In this device, the elongated rod member 70 cooperates with a cylindrical housing assembly 72 in a manner similar to that described with respect to FIGURE 2. The housing assembly 72 is however secured to the floor of the vehicle or the vehicle frame by means of a right angle bracket member 74 having an upper leg 76 provided with apertures 78 for securing the bracket to the frame. A U-clamp 80 is secured to the other leg of the bracket 74 and embraces the cylindrical housing assembly 72 for securing it to the bracket.

The forward end portion of the rigid rod member 70 is adapted to be clamped to the seat base assembly by means of a bracket 82 provided with apertures 84 (FIGURE 4) for securing the bracket to a surface on the vehicle seat base disposed perpendicular to the vehicle frame surface to which the bracket 74 is connected. The bracket 82 has rigidly secured thereto, a clamping block 86 provided with an aperture through which the forward portion of the rigid rod member 70 is received. In the case of the shock absorber device 68, adjustable connection is therefore made at the forward end of the device rather than the rear end as described in connection with the shock absorber device 26 of FIGURES 1 and 2. The forward end portion of the rod member 70 is therefore provided with a plurality of spaced notches 88 adapted to be engaged by an externally threaded lock member 90 threadedly mounted by the clamp block 86 and connected to a clamp-actuating arm 92. The shock absorber device 68 as illustrated in FIGURES 3 and 4, is therefore intended for more permanent installation in a vehicle and the clamping brackets described could be modified in accordance with a vehicle frame construction for such purpose. The shock absorber device 26 on the other hand, is more readily adaptable for replaceable installation in vehicles of different types.

From the foregoing description, the operation and utility of the shock absorber devices of the present invention will be apparent. It will therefore be appreciated, that the shock absorber device of the present invention is particularly designed for accommodating both adjustment of slidably mounted vehicle seats and elimination of the minor yet continuous horizontal vibrations to which such seats are subjected. The shock absorber device is also effective however to cushion the more infrequent violent shocks to which the seat may be subjected. Furthermore, the shock absorber device provides effective yet economical facilities for adjusting the position of the vehicle seat.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mount for a seat comprising in combination, a fixed surface, a seat slidably mounted for movement in fixed spaced relation to said surface, said seat including a frame, track means mounted on the surface and the frame for slidably mounting the seat relative to the surface, anchoring means mounted on the surface, and a shock absorber secured to the anchoring means, said shock absorber including elongated rigid means, limit housing means slidably mounted adjacent one end on said rigid means for limited movement with respect thereto and centering means mounted within said housing means for biasing the rigid means to an adjusted position relative to the fixed surface, first clamp means securing said limit housing means to the anchoring means, second clamp means securing the other end of the rigid means to the frame, and adjustment means operatively connected to one of said clamp means for positioning the housing means relative to the clamp means to vary the adjusted position of the rigid means and the seat relative to the fixed surface without removal of the clamp means.

2. The combination of claim 1 wherein the shock absorber further includes buffer elements mounted within the housing means and engageable with the centering means for yieldably limiting displacement of the rigid means in opposite directions.

3. The combination of claim 1, wherein said adjustment means comprises, an adjustment plate fixed to said housing means and having a plurality of spaced apertures therein and a rod element fixed to said first clamp means received within one of said spaced apertures.

4. The combination of claim 3, wherein each of said clamp means are pivotally connected to the housing means and the rigid means respectively and are releasably engageable with the anchoring means and the frame.

5. The combination of claim 1, wherein said adjustment means comprises spaced notch means on the other end of the rigid means and a threaded lock element mounted by said second clamp means releasably engageable with said notch means.

6. The combination of claim 5, wherein each of said clamp means comprise brackets and respectively, said first clamp means including a U-clamp securing the housing means to one of said brackets and said second clamp means including a clamp block secured to the other bracket and mounting said threaded lock element.

7. The combination of claim 1 wherein said adjustment means includes, an upwardly directed extension connected to the housing having a plurality of spaced apertures therein, and a pin secured to said first clamp means received within one of said apertures.

References Cited by the Examiner

UNITED STATES PATENTS

| | | | |
|---|---|---|---|
| 1,880,181 | 9/32 | Turner | 267—60 X |
| 1,894,743 | 1/33 | Harter | 248—407 |
| 2,421,822 | 6/47 | Wood | 248—54 |
| 2,510,198 | 6/50 | Tesmer | 248—226.1 |
| 2,567,463 | 9/51 | Atkinson | 248—72 X |
| 2,953,191 | 9/60 | Brendel | 248—399 |

FOREIGN PATENTS 526,219 2/54 Belgium.

CLAUDE A. LE ROY, *Primary Examiner.*

FRANK L. ABBOTT, *Examiner.*